United States Patent
Folchert et al.

(10) Patent No.: US 7,590,478 B2
(45) Date of Patent: Sep. 15, 2009

(54) METHOD FOR CONTROLLING THE QUANTITY OF AIR IN A SELF-CONTAINED AIR SUPPLY SYSTEM FOR A CHASSIS

(75) Inventors: Uwe Folchert, Lauenau (DE); Heike Ilias, Wedemark (DE)

(73) Assignee: Continental Automotive Systems US, Inc., Auburn Hills ( * ) Notice: Subject to any disclaimer, the term of this patent is extended or adjusted under 35 U.S.C. 154(b) by 201 days.

(21) Appl. No.: 11/579,479

(22) PCT Filed: Mar. 16, 2005

(86) PCT No.: PCT/EP2005/051186

§ 371 (c)(1),
(2), (4) Date: Nov. 3, 2006

(87) PCT Pub. No.: WO2005/108130

PCT Pub. Date: Nov. 17, 2005

(65) Prior Publication Data

US 2008/0288138 A1    Nov. 20, 2008

(30) Foreign Application Priority Data

May 3, 2004    (DE) .................. 10 2004 021 592

(51) Int. Cl.
*G06F 19/00* (2006.01)
*B60G 17/056* (2006.01)

(52) U.S. Cl. .............. 701/37; 280/6.157; 280/6.159; 280/124.161; 280/5.514; 267/64.11; 267/64.28; 296/190.07; 701/40

(58) Field of Classification Search .............. 701/37, 701/40; 280/6.157, 5.514, 6.159, 161, 124.157; 267/64.28, 64.11
See application file for complete search history.

(56) References Cited

U.S. PATENT DOCUMENTS

| | | | |
|---|---|---|---|
| 5,119,895 A | 6/1992 | Gradert et al. | |
| 6,685,174 B2* | 2/2004 | Behmenburg et al. | .... 267/64.28 |
| 6,698,778 B2* | 3/2004 | Roemer et al. | ........ 280/124.157 |
| 6,726,224 B2* | 4/2004 | Jurr et al. | .................. 280/5.514 |
| 6,817,600 B2* | 11/2004 | Ocker et al. | ................. 267/274 |
| 6,874,772 B2* | 4/2005 | Oldenettel | ............... 267/64.28 |
| 2002/0166321 A1 | 11/2002 | Oldenettel | |
| 2003/0107191 A1 | 6/2003 | Romer et al. | |
| 2004/0260442 A1* | 12/2004 | Holbrook et al. | .............. 701/37 |
| 2005/0173881 A1* | 8/2005 | Harrison et al. | ........ 280/124.16 |
| 2006/0255623 A1* | 11/2006 | Haller | ................... 296/190.07 |
| 2007/0241487 A1* | 10/2007 | Ilias et al. | ................. 267/64.28 |

FOREIGN PATENT DOCUMENTS

JP    06143959    5/1994

\* cited by examiner

*Primary Examiner*—Thomas G Black
*Assistant Examiner*—Lin B Olsen

(57) ABSTRACT

In order to simplify air flow control in a self-contained air supply system, an average control speed is calculated on the basis of a defined movement of the air springs (3, 4) and compared with an optimum control speed. The result of the comparison of the control speeds is used to determine the need for or the excess of an amount of compressed air. There are at least three possibilities for calculating the average control speed.

7 Claims, 3 Drawing Sheets

METHOD FOR CONTROLLING THE QUANTITY OF AIR IN A SELF-CONTAINED AIR SUPPLY SYSTEM FOR A CHASSIS

BACKGROUND OF THE INVENTION

The invention relates to a method for controlling the quantity of air in a self-contained air supply system for a chassis. Such air supply systems are used, for example, for controlling the required level of motor vehicles.

Such an air supply system is known from EP 1 243 447 A2. According to its FIG. 1, this air supply system is composed essentially of an air supply unit and a plurality of air springs for supporting the vehicle chassis. The air supply unit mainly includes a compressor and an air accumulator. The compressor is connected here on the intake side to the atmosphere and on the pressure side to the air accumulator via an air drier and a first 2/2 way valve. The compressor thus supplies the air accumulator with fresh air from the atmosphere. The compressor is connected to the air springs on the intake side via a second 2/2 way valve. As a result, the compressor transfers compressed air from the air springs into the air accumulator via the first 2/2 way valve. The compressor is also connected on the intake side to the air accumulator via a third 2/2 way valve, and is also connected on the pressure side to the air springs via a fourth 2/2 way valve. Compressed air is thus fed from the air accumulator into the air springs. The air springs are arranged parallel to one another, each air spring being assigned a 2/2 way valve and all the 2/2 way valve units being connected to the air supply unit via a collecting line. A pressure sensor is located in the common collecting line of the directional valve unit. Such self-contained air supply systems operate within a previously defined power range whose limits are often undershot as a result of the fact that a quantity of compressed air escapes as a result of a leakage or the limits of said air supply systems are often exceeded as a result of the fact that the quantity of compressed air is increased as a result of a rise in temperature. Within the ride level control of the vehicle this has the effect of slowing down the raising of the vehicle body if the quantity of compressed air is too low and of slowing down the lowering of the vehicle body if the quantity of compressed air is too high. In order to ensure the power range is in its admissible limits, a sufficient quantity of compressed air must therefore always be present in the air supply system. For this purpose, the pressure in the air springs and in the air accumulator is continuously measured using the pressure sensor and the excess of or the demand for an additional quantity of compressed air is calculated therefrom. When there is an excess, a quantity of compressed air is let out of the air supply system, and when there is a demand for a quantity of compressed air fresh air is added to the air accumulator. This aforesaid method satisfies the technical requirements. However, the expenditure in terms of equipment is relatively high. For example, it is necessary to use a pressure sensor with corresponding cabling. This entails additional costs. Furthermore, the pressure sensor with its cabling requires considerable installation space which is generally not available in vehicle engineering and which therefore leads to compromises in the implementation of the air supply system. This also entails higher costs.

DE 101 22 567 C1 discloses a further method for controlling the quantity of air in which the influence of the instantaneous load on the control of the quantity of air is excluded and control of the quantity of air is therefore carried out only when there is a deviation from the layout range of air quantity due to leakage or temperature fluctuation. In this context, the instantaneous quantities of compressed air in the air accumulator and in the air springs are determined by measuring the pressures using a pressure sensor and multiplying them by the known volume of the air accumulator and by the volume of the air springs determined by a travel measurement. This quantity of compressed air which is determined in this way for the air supply system is compared with the optimum quantity of compressed air for a layout load. If the quantity of compressed air which is determined is smaller than a minimum necessary quantity of compressed air, a specific quantity of compressed air must be added, and if it is larger than a maximum admissible quantity of compressed air a specific quantity of compressed air must be let out. The time necessary to add air or let air out is determined from a known controlling speed compressed air quantity characteristic curve and the corresponding valves or the compressor in the air supply system are activated for this time period. This method also requires the presence of a pressure sensor with all its disadvantages which have already been described. In addition, this method is relatively complex in terms of software technology because the actual volume quantity always has to be calculated in order to determine the time necessary to add or let out air.

The object is therefore to simplify the method of the generic type for controlling the quantity of air in a closed air supply system.

SUMMARY OF THE INVENTION

This object is achieved by a method in which the demand for or the excess of a necessary quantity of compressed air for the air supply system is determined for a specified layout and is fed into the air supply system or let out of it over a defined time. According to the invention, an average controlling speed is calculated from a defined movement of the air springs and is compared with an optimum controlling speed, the demand for or the excess of a quantity of compressed air being determined from the comparison between the controlling speeds.

The new method eliminates the aforesaid disadvantages of the prior art. The particular advantage of the new method here is that in order to determine the deficit or the excess in terms of the quantity of compressed air it is no longer necessary to carry out a complex pressure measurement but rather all that is necessary is to measure the travel and/or the time required to carry it out during a raising and/or lowering process. Such a travel measurement or time measurement is possible with relatively simple means which generally form part of the technical equipment of the system. This simplifies the equipping of the air supply system and reduces the costs necessary to do so. This expenditure on equipment can also be reduced further if for example the travel is predefined for the movement of the air spring. Then only the time has to be measured. The new method for controlling the quantity of air can of course also be applied in other air supply systems.

The new method will be explained in more detail with reference to a plurality of exemplary embodiments.

DETAILED DESCRIPTION OF THE DRAWINGS

Figure 1:
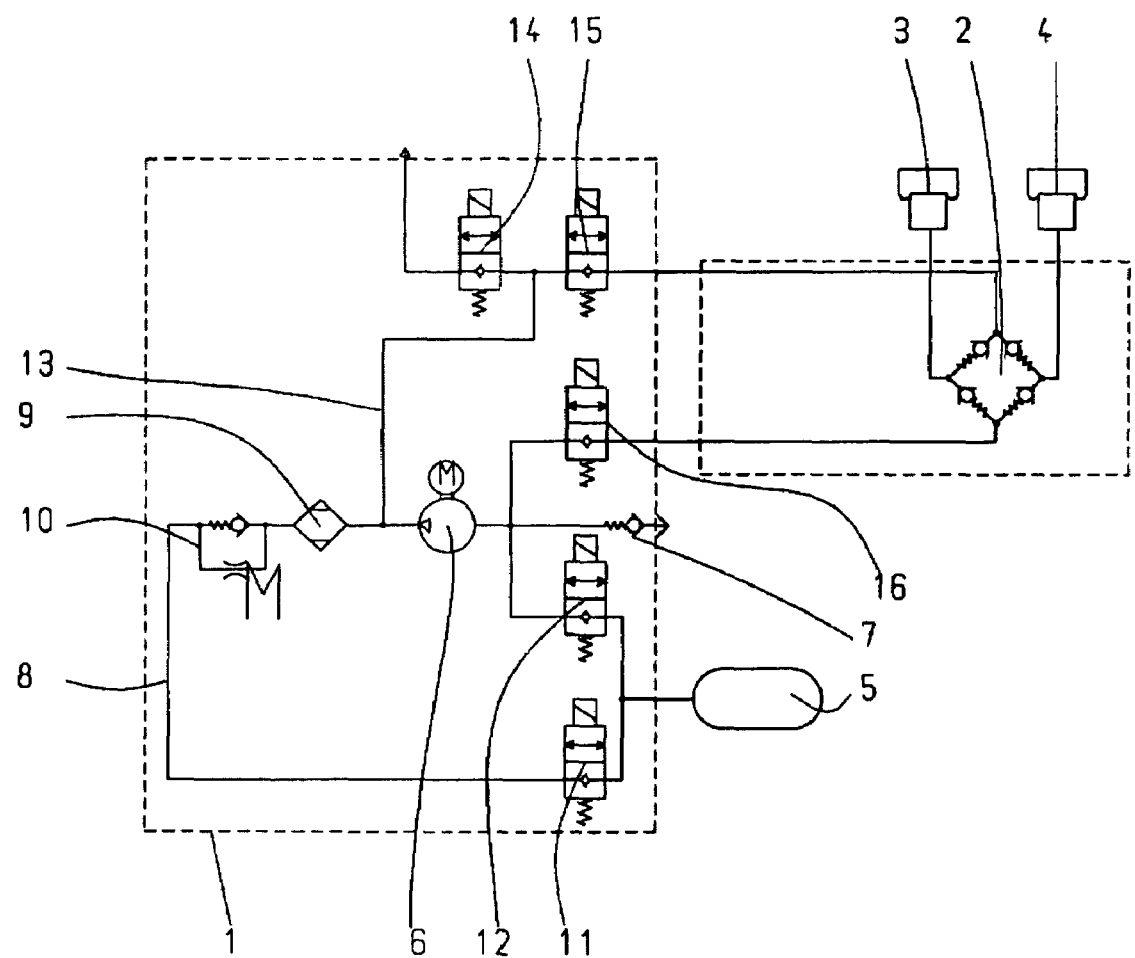
FIG. 1 shows a circuit diagram of a self-contained air supply system.

As is shown by FIG. 1, the air supply system is essentially composed of a drive unit 1, of a nonreturn valve combination 2, of at least two air springs 3, 4 and of an air accumulator 5. The core element of the drive unit 1 is a compressor 6 which is driven by an electric motor and which is connected on one side to the atmosphere via an intake valve 7. On the pressure side the compressor 6 is connected via an accumulator pressure line 8 to the air accumulator 5. In this accumulator pressure line 8 there is an air drier 9, a throttle nonreturn valve 10 which opens in the direction of the air accumulator 5 and a first pressure side 2/2 way valve 11. The compressor 6 is also connected on the intake side to the air accumulator 5 via a first intake side 2/2 way valve 12. On the pressure side the compressor 6 is also connected, via an actuator pressure line 13, both to the atmosphere, via a blow off valve 14, and to the air springs 3, 4 via a second pressure side 2/2 way valve 15 and the nonreturn valve combination 2. The compressor 6 is also connected on the intake side to the air springs 3, 4 via a second intake side 2/2 way valve 16 and the nonreturn valve combination 2. The nonreturn valve combination 2 is constructed in such a way that it brings about a connection to the pressure side or to the intake side of the compressor 6 as a function of the direction of movement of the air springs 3, 4.

In order to fill the air accumulator 5 with fresh air from the atmosphere, the two intake side 2/2 way valves 12, 16 and the pressure side 2/2 way valve 15 as well as the blow off valve 14 are closed and the first pressure side 2/2 way valve 11 is opened. The compressor 6 sucks in the fresh air from the atmosphere via the intake valve 7 and feeds it into the air accumulator 5 via the air drier 9, the opening throttle nonreturn valve 10 and the opened first pressure side 2/2 way valve 11. In order to fill the air springs 3, 4 with compressed air from the air accumulator 5, the first pressure side 2/2 way valve 11, the second intake side 2/2 way valve 16 and the blow off valve 14 are closed. In contrast, the first intake valve 2/2 way valve 12 and the second pressure side 2/2 way valve 15 of the compressor 6 are opened so that the compressor 6 sucks in the air from the air accumulator 5 and feeds it to the air springs 3, 4 via the actuator pressure line 13 and the nonreturn valve combination 2. In order to transfer dried compressed air which is not required from the air springs 3, 4 into the air accumulator 5, the first intake side 2/2 way valve 12, the second pressure side 2/2 way valve 15 and the blow off valve 14 are closed and the second intake side 2/2 way valve 16 and the first pressure side 2/2 way valve 11 are opened. As a result, the air from the air springs 3, 4 passes into the air accumulator 5 via the nonreturn combination 2, the compressor 6 and the first pressure side 2/2 way valve 11. In order to regenerate the drier 10 with dried compressed air which is not required from the air pressure accumulator 5, the two intake side 2/2 way valves 12, 16 and the second pressure side 2/2 way valve 15 are closed and the first pressure side 2/2 way valve 11 and the blow off valve 14 are opened. As a result, air is fed into the atmosphere counter to the filling direction from the air accumulator 5 via the accumulator pressure line 8, the throttled throttle nonreturn valve 10, the air drier 9, the actuator pressure line 16 and the blow off valve 14.

In order to safeguard all these functions it is necessary for a sufficient quantity of compressed air to be present within a quantity of air tolerance band in the air supply system for a layout vehicle load. If the quantity of compressed air drops below the layout tolerance range of the air quantity, the air supply system must be topped up with a necessary quantity of compressed air. In contrast, if the layout quantity of compressed air exceeds the layout tolerance range of the air quantity, a specific quantity of compressed air is let out of the air supply system. In both cases the loaded vehicle body is raised or lowered with a tolerance speed.

Figure 2:
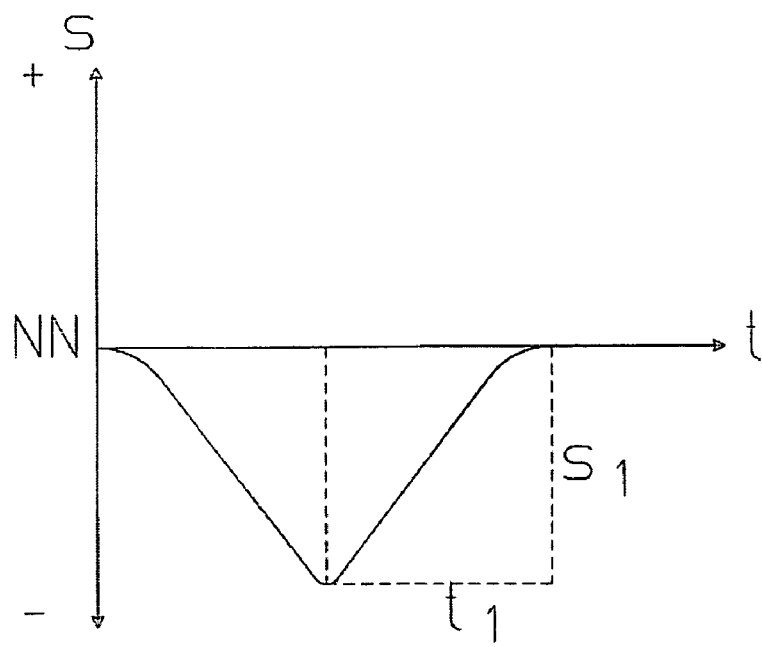
FIG. 2 is a graphic illustration of the travel/time behavior of the air spring during the spring compression of the air spring.
Figure 3:
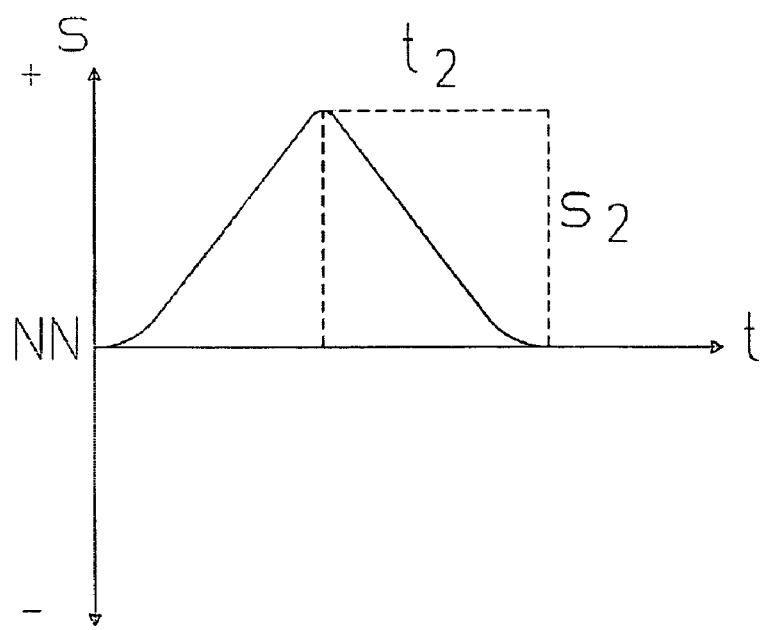
FIG. 3 is a graphic illustration according to FIG. 2 during the spring extension of the air spring and FIG. 4 is a graphic illustration of raising speeds as a function of the pressure in the air accumulator and of the load.

The new method is presented for controlling the quantity of air in the self-contained air supply system in a first exemplary embodiment. Here, the quantity of compressed air for supplying the air supply system is firstly defined in such a way that at the specific layout load the pressures in the air accumulator 5 and in the air springs 3, 4 are the same so that when there is a connection between the air accumulator 5 and the air springs 3,4 the air springs 3,4 are not displaced. In order to determine the deviation of the quantity of compressed air from the layout tolerance range of the air quantity, all the intake side and pressure side 2/2 way valves 11, 12, 15, 16 are opened, while the blow off valve 14 remains closed. As a result, the air springs 3, 4 and the air accumulator 5 are connected to one another in such a way that a quantity of air can be exchanged in both directions. Depending on the load at the air springs 3, 4, the air springs 3, 4 experience spring compression below the normal height level NN as is shown in FIG. 2, or experience spring extension beyond the normal height level NN according to FIG. 3, or remain unchanged. In this context, the direction of movement of the air springs 3, 4 firstly indicates whether the current load is greater or smaller than the layout and/or the current quantity of compressed air is less than or greater than the optimum quantity of compressed air for the layout.

Air springs 3, 4 which have experienced spring compression are raised again to the normal height level NN directly afterwards using the compressor 6 according to FIG. 2, the travel $s_1$ which is carried out and the time $t_1$ required for it being measured. An average raising speed is calculated from this and is compared with a set point raising speed which is stored in the control component of the air supply system. If the average raising speed is smaller than the raising speed for the minimum quantity of compressed air of the air quantity band, the quantity of compressed air in the air supply system is too small. The accumulator is filled with fresh compressed air over a defined time by means of a corresponding connection of the 2/2 way valves 11, 12, 14, 15 and 16. Air springs 3, 4 which have experienced spring extension are lowered again to the normal height level NN directly afterwards according to FIG. 3, the travel $s_2$ which is carried out and the time $t_2$ required for it being measured. An average lowering speed is calculated from this and is compared with a set point lowering speed stored in the control component of the air supply system. If the average lowering speed is higher than the lowering speed for the maximum quantity of compressed air of the air quantity band, the quantity of compressed air in the air supply system is too large and a specific quantity of compressed air has to be let out of the air accumulator 5. By correspondingly switching the 2/2 way valves 11 and 14, excess compressed air is let out of the air accumulator 5 via the drier 9 over a defined time. The air supply system therefore contains again a quantity of compressed air which is within the band for the quantity of compressed air for the layout. If the ride level positions of the air springs 3, 4 remain unchanged, the load and the quantity of compressed air then correspond to the layout.

Figure 4:
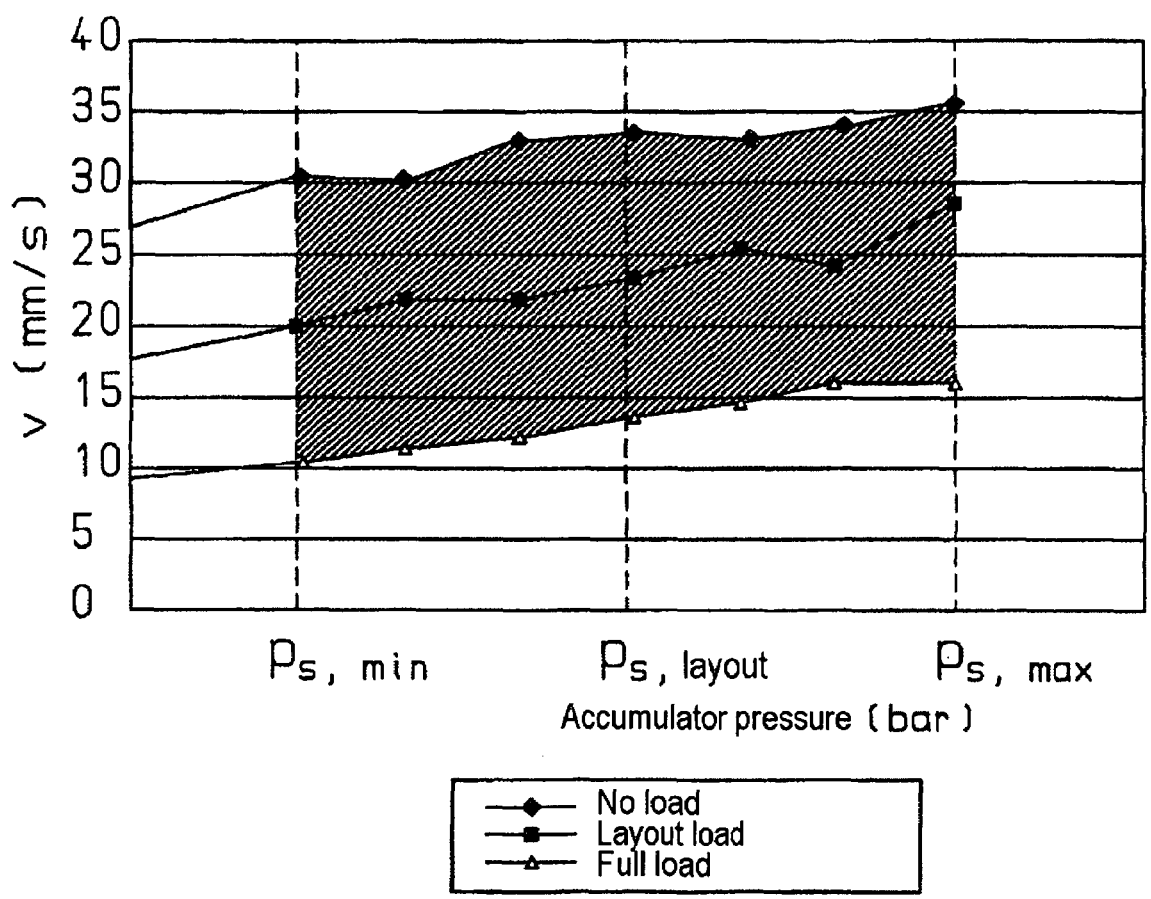

The air quantity in the self-contained air supply system can also be controlled according to the new method with a second exemplary embodiment. To do this, the raising speeds of an idling load, of a full load and of a layout load must firstly be determined empirically from the normal height level NN over a predetermined distance with difference pressures in the air accumulator 5 and are illustrated in a diagram. Such a diagram is illustrated in FIG. 4. A defined admissible deviation of the air quantity defines an admissible minimum air accumulator pressure $P_{s\,min}$ and a maximum air accumulator pressure $P_{s\,max}$. These limiting pressures are incorporated into the diagram.

In order to control the quantity of compressed air for the air supply system which is in operation, in a current load situation a defined raising process carried out over a predetermined amount of travel. The time required for this is measured and the average current raising speed is calculated from the defined travel and the time required. This rating speed is compared with all three load characteristic curves for the no load situation, the layout load and the full load using the diagram according to FIG. 4. If the calculated raising speed lies within the load characteristic curves for the full load and the no load situation, a sufficient quantity of compressed air is present in the air supply system. If, on the other hand, the calculated raising speed lies below the full load characteristic curve at the accumulator pressure $P_{s,\,min}$, an excessively low quantity of compressed air is present in the air supply system. The compressor and the corresponding 2/2 way valves are activated for a defined time in order to feed air into the air accumulator 5 from the surroundings. The converse occurs if the calculated raising speed is above the no load characteristic curve at the accumulator speed $P_{s,max}$, and there is then an excessively large quantity of compressed air in the air supply system. The corresponding 2/2 way valves are actuated for a defined time in order to let air out of the air accumulator 5 into the surroundings. The air supply system thus again contains the quantity of compressed air within the band for the quantity of compressed air for the layout.

The control of the air quantity in the self-contained air supply system according to the new method can also be performed with a third exemplary embodiment. This exemplary embodiment is applied if the pressure in the air accumulator 5 is lower than the pressure in the air springs 3, 4. At first, an enclosed control space is selected within the air supply system, for which purpose the crank casing of the compressor 6 and the air drier 6 are most suitable. This control space is placed at a defined pressure level. It is thus expedient to connect this control space to the atmosphere using the 2/2 way valve 14 so that the atmospheric pressure is set in the control space. The 2/2 way valve 16 is then opened for a defined time so that a quantity of compressed air flows from the air springs 3, 4 with the higher pressure into the control space with the lower pressure until the pressure is equalized. Then, the air supply system is re-activated until the vehicle axle is located in the NN home position again. Here, the travel carried out by the air springs 3, 4 and the time required to do this are measured. An average raising speed is calculated from this travel and the measured time. Depending on the load state a characteristic speed range $V_{min} \leq v \leq V_{max}$ are calculated from a simulation or from a measurement. The calculated raising speed is then compared with the admissible raising speeds. If it is determined that the calculated raising speed lies within the admissible raising speeds $V_{min} \leq v \leq V_{max}$, a sufficient quantity of compressed air is present. If the calculated raising speed is below the admissible raising speed $V_{min}$, an excessively low quantity of compressed air is present in the air supply system. For a defined time, the compressor 6 and the corresponding 2/2 way valves are activated and air is fed into the air accumulator 5 from the surroundings. The converse occurs if the calculated raising speed is above the admissible raising speed $v_{max}$, and an excessively large quantity of compressed air is then present in the air supply system.

The corresponding 2/2 way valves are activated again for a defined time in order to emit air into the surroundings from the air accumulator 5. The air supply system then contains again a quantity of compressed air which is within the band for the quantity of compressed air for the layout.

LIST OF REFERENCE NUMERALS

1 Drive unit
2 Nonreturn valve combination
3 Air spring
4 Air spring
5 Air accumulator
6 Compressor
7 Intake valve
8 Accumulator pressure line
9 Air drier
10 Throttle nonreturn valve
11 First pressure side 2/2 way valve
12 First intake side 2/2 way valve
13 Actuator pressure line
14 Outlet valve
15 Second pressure side 2/2 way valve
16 Second intake side 2/2 way valve

The invention claimed is:

1. A method for controlling the quantity of air in a self-contained air supply system for a chassis, in which a deficit or an excess of compressed air for the air supply system is determined for a specified layout and in which supplemental air is supplied to the air supply system or excessive air is released from the air supply system over a defined time, comprising the following steps:
  calculating an average controlling speed from a defined movement of air springs (3, 4)'
  comparing the average controlling speed with an optimum controlling speed, and
  determining a deficit or an excess of compressed air in the air supply system from the comparison between the average controlling speed and the optimum controlling speed.

2. The method as claimed in claim 1, wherein, for the calculation of the average controlling speed, the following steps are performed:
  carrying out a pressure equalization between the air springs (3, 4) and an air cell (5), whereby the air springs are retracted or extended,
  subsequently raising or lowering the air springs (3, 4) to a defined height level, and
  measuring the travel carried out during the raising or lowering process and the time required for the travel.

3. The method as claimed in claim 1, wherein, for the calculation of the average controlling speed, the following steps are performed:
  raising the air springs (3, 4) to a defined height level,
  measuring the travel carried out during the raising process and the time required for the travel, and
  composing the optimum controlling speed of a controlling speed range which is formed from a full load characteristic curve, a specific design characteristic curve and an idling load characteristic curve, wherein all the characteristic curves are bounded by a minimum accumulator pressure $p_{smin}$ and a maximum accumulator pressure $p_{smax}$ and wherein the minimum accumulator pressure $p_{smin}$ in the full load characteristic curve and the maximum accumulator pressure $p_{smax}$ in the idling load characteristic curve forming comparison criteria.

4. The method as claimed in claim 1, wherein, for the calculation of the average controlling speed, the following steps are performed:
- carrying out a pressure equalization between the air springs (3, 4) and an enclosed control space with a defined pressure
- raising those air springs (3, 4), which have been retracted in the pressure equalization, to a defined height level,
- measuring the travel carried out during the raising process and the time required for the travel, and
- determining the optimum controlling speed from a speed range $v_{min} \leqq v \leqq v_{max}$ simulated or measured as a function of load, from a minimum raising speed $v_{min}$, and from a maximum raising speed $v_{max}$ forming comparison criteria.

5. The method as claimed in claim 4, wherein the enclosed control space is embodied by a crank housing of a compressor (6) and an air drier (9) and the pressure in the control space is approximated to the atmosphere.

6. The method as claimed in claim 1, wherein, for the defined movement, the travel of the air springs (3, 4) is predefined in order to raise or lower the air springs (3, 4) to a defined height level, the method comprising the step of
- measuring the time required for the predefined travel.

7. The method as claimed in claim 1, wherein, for the defined movement, the duration of air spring travel is predefined, the method comprising the step of
- measuring the travel carried out by the air springs (3, 4).

\* \* \* \* \*